Patented Aug. 6, 1935

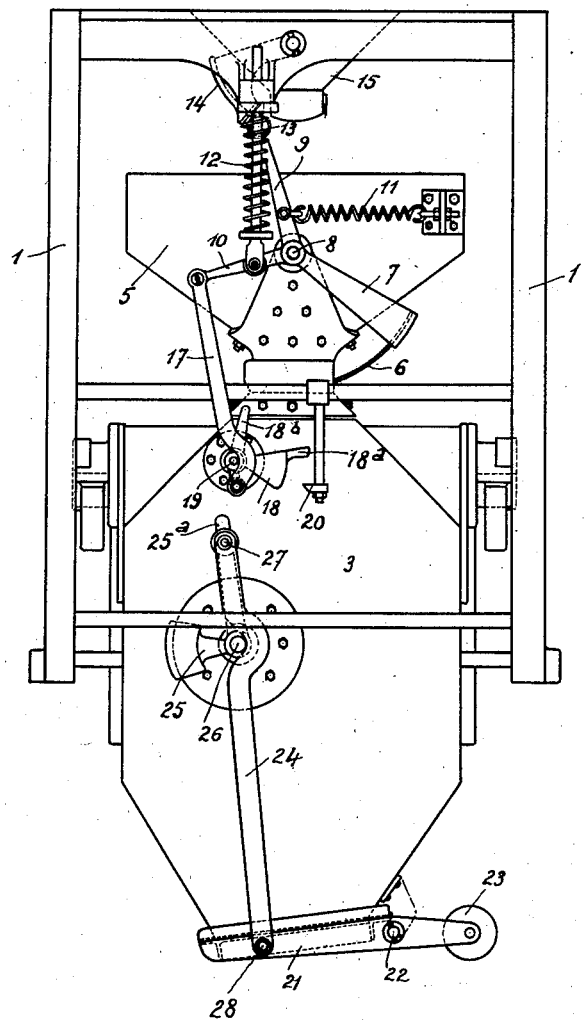

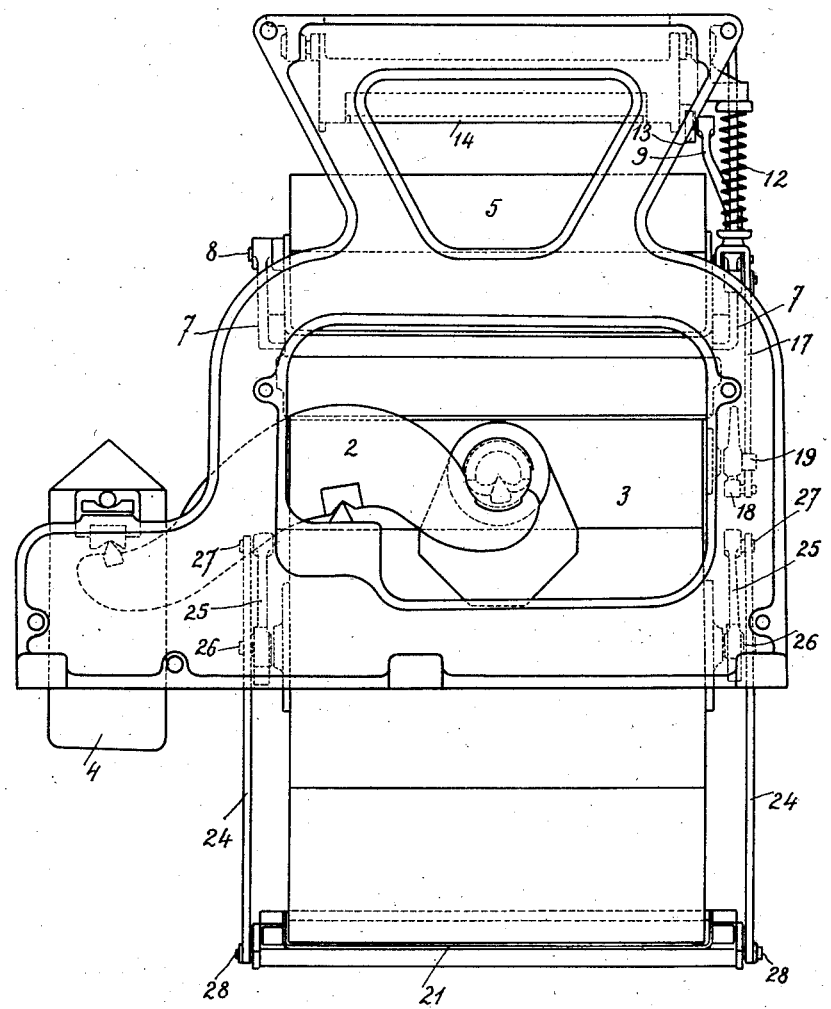

2,010,760

UNITED STATES PATENT OFFICE 2,010,760

LARGE OUTPUT DEVICE FOR MEASURING VOLUMES OF GRANULATED MATERIAL

Alfred Hanique, Paris, France

Application December 15, 1933, Serial No. 702,634
In France December 29, 1932

1 Claim. (Cl. 73—137)

Automatic devices are well known which allow volumes of granulated material to be measured and the measuring part of which is constituted by a rotary drum divided into a plurality of compartments, generally four, adapted to be filled and emptied in succession. In devices of this type, only one compartment is filled with material at a time during operation as it is precisely the weight of the material contained in the compartment considered which causes its unbalancing with reference to the other compartments which are empty and consequently produces the rotation of the drum; the result of this arrangement is that, when it is desired to make use of measuring compartments having a predetermined capacity, the volume of the drum must be four times greater and the three quarters of this total volume remain always unoccupied. Without speaking of the resulting bulkiness, the large size of the measuring parts forms, from a mechanical standpoint, a great drawback as the operation of the device requires the successive starting and stopping at more or less close intervals of a bulky part, the movements thus produced being of large amplitude; now the effects of inertia arising therethrough must be compensated for, in order to retain a high accuracy of measurement, by comparatively intricate means, and they act moreover in a detrimental manner on the state of preservation of the parts of the device. This drawback is all the more considerable, as it is necessary for the drum to rotate at a comparatively high speed when the output of grain is to be sufficient, whereby the parts are speedily worn out or damaged.

My invention has for its object an entirely automatic apparatus for measuring any desired volume of granulated material under constant heaping up conditions, which apparatus removes the above mentioned drawbacks. To this end, the measuring part is constituted by a receiver or skip the total capacity of which is used for measuring purposes and which is submitted only to vertical displacements of very small amplitude not exceeding the amplitude of the displacements effected by scales. Thus the bulkiness is considerably reduced with reference to the above recalled type, the comparison being made for equal measuring capacities and substantially no effects due to inertia are apparent.

The receiver is associated with a compensating hopper which receives the excess of granulated material required to complete or make up the weight necessary for operating the device. This allows the measuring without changing the counterweight, of material of different specific weights. This compensating hopper is fed from a stationary hopper; the control of the doors and trap-doors of said receiver and hoppers is provided through the agency of special synchronizing means which form one of the characteristic features of my invention.

Fig. 1 is a front view thereof.
Fig. 2 is a side view.

The device comprises chiefly a receiver 3 carried by a balance-beam 2 carried in its turn by the frame 1 and provided at its other end with a counterweight 4.

Above the receiver 3 is arranged a compensating hopper 5 the lower opening of which is in communication with the upper opening of the receiver and may be closed by a trap-door 6 secured to the straps 7 rotatably mounted on trunnions 8 secured to the sides of the hopper 5. Rigidly connected to one of these straps 7 are the levers 9 and 10 submitted respectively to the action of the spring 11 secured to the hopper 5 and to the action of the spring 12 secured to the frame 1.

The lever 9 is provided at its free end with a roller 13 controlling the opening and closing of the door 14 of the loading hopper 15. The lever 10 is connected through the connecting rod 17 with the lower lug of the part 18 pivotally secured to the trunnion 19 carried by the receiver 3. The lower end of said connecting rod is bent so as to pass round the trunnion 19 against which it abuts and to keep firmly in its open position the trap-door 6 in spite of the tension of the spring 11.

The frame 1 carries a stop 20 against which the projection 18ª on part 18 is adapted to bear when the receiver moves downwards, part 18 being provided moreover with a tail-piece 18ᵇ.

The receiver 3 is provided at its lower end with a door 21 hingedly secured to the spindle 22 fixedly secured to or integral with the receiver. The weight of the door 21 is balanced by the counterweight 23 which urges it always back into its closing position.

A pair of connecting rods 24 having their lower ends pivotally connected as at 28 to the door 21 and their upper ends pivotally connected as at 27 to the lever 25 are arranged upon the opposed sides of the receiver 3. Carried by the receiver 3 is a shaft having projecting trunnions 26 to each of which is rigidly connected a lever 25 and the rods 24 are each provided with a bent portion forming a recess for the reception of the projecting ends or trunnions 26. When the rods 24 are in the position as is better illustrated in Figure 1 of the drawings, the door 21 will be retained or locked in its closed position as the three pivotal points 26, 27 and 28 are in alinement.

The operation is as follows:

The device being in the position shown, the granulated material arriving in the hopper 15 flows into the compensating hopper 5 from where it falls into the receiver, and when the latter is full, the load of grain or the like material rises in the hopper 5 until the total weight of grain balances the counterweight 4. The receiver then moves downwards with the hopper 5 which is rigidly secured to it.

Should the weight of the material contained in the receiver 3 not be sufficient to counteract the weight 4, additional material is fed to and stored within the compensating hopper 5 until the combined weight of the materials contained in the receiver 3 and hopper 5 are sufficient to exceed the weight of the member 4. By this arrangement, it is obvious that the volume of various materials having different specific weights may be measured without the necessity of changing the size of the counterweight 4.

During this downward movement of the receiver, the roller 13 of the lever 9 which was holding open the door 14 of the hopper 15 moves away from said door which closes under the action of its own weight; on the other hand the projection 18ᵃ on part 18 meets the stationary stop 20. As the receiver continues sinking, part 18 rotates around the trunnion 19 and by reason of the displacement thus impressed on the lower lug of said part 18, the connecting rod 17 connected with said lug is released and moves under the action of the spring 11. This releases the system 9—10—7 which pivots around the trunnion 8 and draws along with it the trap-door 6 which shuts off in a sudden manner the communication between the compensating hopper 5 and the receiver 3 inside which it levels the granulated material. The end of the lever 10, the lug of part 18 and the trunnion 19 are then in alinement.

In the meantime the spring 11 has urged, through the connecting rod 17, the part 18 through a half-revolution and the tail end 18ᵇ thereof has met the head 25ᵃ formed with one of the levers 25 which is thereby rocked towards the right of Fig. 1. Henceforward the action exerted by the weight of the material on the door 21, and which is transmitted through the connecting rods 24, is no longer exerted in the direction of the levers 25. Consequently this action is no longer absorbed by the trunnions 26 and the door opens whereby it allows the measured material to flow out.

As it empties, the receiver 3 rises under the action of the counter weight 4 and through the intermediary of the connecting rod 17 and of lever 10 it compresses the spring 12 without however producing any angular movement of said lever 10 which is held fast by the part 18.

When the receiver is empty, the door 21 closes under the action of its counter weight 23 and urges upwards the connecting rods 24 and the rocking lever 25 the head 25ᵃ of which hits the tail-piece 18ᵇ of part 18, which causes the connecting rod 17 to move. Under the action of the spring 12 which had been compressed during the rising motion of the receiver 3, the system comprising the strap 7 and the levers 9—10 rotates bodily around the trunnion and returns into its starting position. At the same time the part 18 also rotates through a half revolution and returns into its starting position. During this movement, the strap 7 carries along with it the trap-door 6 whereby the compensating hopper 5 is put again in communication with the receiver 3. At the same time the spring 11 is again tensioned and the roller 13 makes the trap-door 14 rock so as to allow the feed of the receiver to be resumed.

In order that the above disclosed operations may be performed it is necessary for the spring 11 to be weaker than the spring 12, the latter exerting a force reaching its maximum value when the receiver is in its upper position and being without effect when the receiver is in the lowermost position.

Each operation is recorded by a meter well known per se and not illustrated.

Suitable safety means, not shown for sake of clarity, act respectively on part 18 through its tail-piece 18ᵇ and on the pivotal connection 27. These two arrangements prevent any untimely release before the suitable predetermined moment.

With the device described, it is possible to give the receiver a large capacity. The releases are then operated at a very slow rhythm say about three per minute for instance.

What I claim is:

An automatic device for measuring the volume of granulated materials having various specific weights comprising a support, a lever pivotally connected to said support, a counterweight carried by one end of said lever, a receiver carried by the opposite end of said lever and adapted to hold a predetermined quantity of material, a compensating hopper rigidly mounted upon said receiver and adapted to hold an additional quantity of material, a valve for said compensating hopper for controlling a material supply opening leading from said compensating hopper to said receiver, a valve for controlling a material outlet opening leading from the bottom of said receiver, a feeding hopper mounted upon said support, a valve for said feeding hopper for controlling a material supply opening therein leading to said compensating hopper, means carried by said receiver for locking said valve for its outlet opening in closed position, comparatively weak yielding means for normally closing the valve of said compensating hopper and releasing the valve of said feeding hopper whereby the latter may be closed by gravity; compensating hopper carried means adapted to retain the valves of said compensating and said feeding hoppers in open position against the action of said weak yielding means when the receiver is in its elevated position, a rotary member mounted upon said receiver, a stationary abutment extending within the path of travel of said rotary member whereby when said receiver is lowered said member will be caused to rotate, in one direction for releasing said locking means for the valve of the outlet opening of the receiver whereby the material contained therein may flow therefrom, a mechanical connection between said compensating hopper carried means and said rotary member whereby with rotation of said member and with the assistance of said weak yielding means, the valves of said feeding and compensating hoppers will be closed for shutting off the supply of material to said compensating hopper and receiver, a comparatively strong yielding means connecting said hopper carried means with said support, means carried by said locking means for the valve of said receiver for causing the rotation of said rotary member in an opposite direction upon the upward movement of said receiver caused by said counterweight at the termination of the flow of material from said receiver whereby said hopper carried means will be operated and with the assistance of said comparatively strong yielding means cause the opening of said valves for said feeding and compensating hoppers and the further rotation of said rotary member so as to bring the latter out of contact with said locking means for the valve of the outlet opening in said receiver, and means carried by said valve for its outlet opening in said receiver for automatically closing the same.

ALFRED HANIQUE.